United States Patent
Kondo et al.

(10) Patent No.: US 11,859,993 B2
(45) Date of Patent: Jan. 2, 2024

(54) IN-VEHICLE APPARATUS AND PROCESSING METHOD THEREOF

(71) Applicant: FAURECIA CLARION ELECTRONICS CO., LTD., Saitama (JP)

(72) Inventors: Akihiro Kondo, Tokyo (JP); Noriyuki Abe, Saitama (JP); Norikazu Nara, Saitama (JP); Makoto Orino, Hitachi (JP); Takaaki Yashiro, Hitachi (JP)

(73) Assignee: FAURECIA CLARION ELECTRONICS CO., LTD., Saimata (JP)

( * ) Notice: Subject to any disclaimer, the term of this patent is extended or adjusted under 35 U.S.C. 154(b) by 297 days.

(21) Appl. No.: 17/284,757

(22) PCT Filed: Aug. 28, 2019

(86) PCT No.: PCT/JP2019/033787
§ 371 (c)(1),
(2) Date: Apr. 12, 2021

(87) PCT Pub. No.: WO2020/075409
PCT Pub. Date: Apr. 16, 2020

(65) Prior Publication Data
US 2021/0348936 A1 Nov. 11, 2021

(30) Foreign Application Priority Data
Oct. 12, 2018 (JP) .................. 2018-193904

(51) Int. Cl.
*G01C 21/34* (2006.01)
*G01C 21/36* (2006.01)

(52) U.S. Cl.
CPC ..... *G01C 21/3492* (2013.01); *G01C 21/3617* (2013.01); *G01C 21/3685* (2013.01)

(58) Field of Classification Search
CPC ............ G01C 21/3492; G01C 21/3617; G01C 21/3685
See application file for complete search history.

(56) References Cited

U.S. PATENT DOCUMENTS

| | | | |
|---|---|---|---|
| 2001/0009427 A1* | 7/2001 | Kaneko ............ | G08G 1/096872 715/854 |
| 2014/0129132 A1* | 5/2014 | Yoshizu ............... | G08G 1/0129 701/400 |

FOREIGN PATENT DOCUMENTS

| | | | |
|---|---|---|---|
| JP | 2003042787 A | 2/2003 | |
| JP | 2007051999 A | 3/2007 | |

(Continued)

OTHER PUBLICATIONS

International Search Report w/English translation and Written Opinion of PCT/JP2019/033787, dated Nov. 26, 2019, 9 pages.

(Continued)

*Primary Examiner* — Vivek D Koppikar
*Assistant Examiner* — Godfrey Aleksander Maciorowski
(74) *Attorney, Agent, or Firm* — Reising Ethington PC

(57) ABSTRACT

Based on position information indicating a position of a vehicle on a map, whether the vehicle has arrived at an entrance of an area in a vicinity of a destination of the vehicle where road links do not exist is determined, a history of the vehicle having parked in the area is stored as parking information, the parking information is referenced when it is determined that the vehicle has arrived at the area, and guidance information is output as information which guides the vehicle based on recommendation information and which includes at least a parking position in the area.

10 Claims, 12 Drawing Sheets

| DEPARTURE POINT ID | DESTINATION POINT ID | NUMBER OF TIMES |
|---|---|---|
| 1 | 2 | 30 |
| 1 | 3 | 10 |
| 2 | 3 | 20 |
| 4 | 2 | 10 |
| 5 | 3 | 10 |

(56) References Cited

FOREIGN PATENT DOCUMENTS

| | | | |
|---|---|---|---|
| JP | 2008-96362 A | | 4/2008 |
| JP | 2008096362 | * | 4/2008 |
| JP | 2010-230420 A | | 10/2010 |
| JP | 2010230420 | * | 10/2010 |
| JP | 2016-95161 A | | 5/2016 |

OTHER PUBLICATIONS

Office Action issued by the Japanese Patent Office for application 2018-193904 dated Sep. 6, 2022; 6 pages.

* cited by examiner

FIG. 4

| POINT ID | LINK DEVIATION ID | VEHICLE DIRECTION | FORWARD DIRECTION/ REVERSE DIRECTION | PARKING DIRECTION | FLOOR NUMBER (HEIGHT) |
|---|---|---|---|---|---|
| 1 | 10 | 0 | FORWARD DIRECTION | LEFT OF LINK | 1 |
| 2 | 10 | 180 | REVERSE DIRECTION | LEFT OF LINK | 1 |
| 3 | 20 | 80 | FORWARD DIRECTION | ON LINK | 1 |
| 4 | 10 | 0 | FORWARD DIRECTION | LEFT OF LINK | 2 |
| 5 | 10 | 0 | FORWARD DIRECTION | LEFT OF LINK | 3 |

FIG. 8

| ENTRY LINK | EXIT LINK | NUMBER OF TIMES |
|---|---|---|
| 1 | 2 | 30 |
| 1 | 3 | 10 |
| 2 | 3 | 20 |

IN-VEHICLE APPARATUS AND PROCESSING METHOD THEREOF

CROSS-REFERENCE TO RELATED APPLICATION(S)

This application is a U.S. National Phase Patent Application of International Application Number PCT/JP2019/033787, filed on Aug. 28, 2019, which claims priority of Japanese Patent Application Number 2018-193904, filed on Oct. 12, 2018, the entire content of each of which is incorporated herein by reference.

TECHNICAL FIELD

The present invention relates to an in-vehicle apparatus which supports the driving by a driver, and to the processing method thereof.

BACKGROUND ART

In recent years, technologies of accumulating a travel history of a vehicle in an in-vehicle apparatus or a server, and utilizing the accumulated travel history to predict the travel route of a driver are being developed. For example, PTL 1 describes the following: "A route estimation device comprising a position detection means which detects a position of one's own vehicle, a storage means which stores map data including at least a road link, a road link identification means which identifies the road link on a travel route traveled on by one's own vehicle based on a position of one's own vehicle and the map data, and an estimation means which estimates a route of one's own vehicle, wherein the storage means associates and stores a combination of successive road links on the travel route and a number of passages, which is a number of times that one's own vehicle passed through the combined road links, and the estimation means estimates the route of one's own vehicle based on the correspondence of the combination and the number of passages."

CITATION LIST

Patent Literature

[PTL 1] Japanese Unexamined Patent Application Publication No. 2016-95161

SUMMARY OF THE INVENTION

Problems to be Solved by the Invention

PTL 1 described above as a conventional technology is a technology of predicting the route of the road to be traveled by one's own vehicle until reaching the destination. Nevertheless, while PTL 1 describes guiding the vehicle on the road to be traveled until one's own vehicle arrives at the destination, PTL 1 does not describe guiding one's own vehicle, after arriving at the destination, in an area in the vicinity of the destination where road links do not exist.

An object of the present invention is to propose an in-vehicle apparatus and a processing method thereof capable of presenting necessary information to a driver in an area, such as a parking lot, where road links do not exist.

Means to Solve the Problems

In order to achieve the foregoing object, the present invention provides an in-vehicle apparatus, comprising: an arrival place determination processing unit which determines, based on position information indicating a position of a vehicle on a map, whether the vehicle has arrived at an entrance of an area in a vicinity of a destination of the vehicle where road links do not exist; a parking information storage unit which stores, as parking information, a history of the vehicle having parked in the area; and a recommendation unit which refers to the parking information when the arrival place determination processing unit determines that the vehicle has arrived at the area, and outputs guidance information as information which guides the vehicle based on recommendation information and which includes at least a parking position in the area.

The present invention additionally provides a processing method of an in-vehicle apparatus, comprising: an arrival place determination processing step of determining, based on position information indicating a position of a vehicle on a map, whether the vehicle has arrived at an entrance of an area in a vicinity of a destination of the vehicle where road links do not exist; a parking information storage step of storing, as parking information, a history of the vehicle having parked in the area; and a recommendation step of referring to the parking information when it is determined in the arrival place determination processing step that the vehicle has arrived at the area, and outputting guidance information as information which guides the vehicle based on recommendation information and which includes at least a parking position in the area.

Advantageous Effects of the Invention

According to the present invention, necessary information can be presented to a driver in an area where road links do not exist and, consequently, it is possible to improve the user-friendliness for the driver.

BRIEF DESCRIPTION OF DRAWINGS

FIG. 4 is a configuration diagram showing an example of the point information table according to an embodiment of the present invention.

FIG. 8 is a configuration diagram showing an example of the travel history according to an embodiment of the present invention.

DESCRIPTION OF EMBODIMENTS

An embodiment of the present invention is now explained with reference to the appended drawings.

First Embodiment

Figure 1:
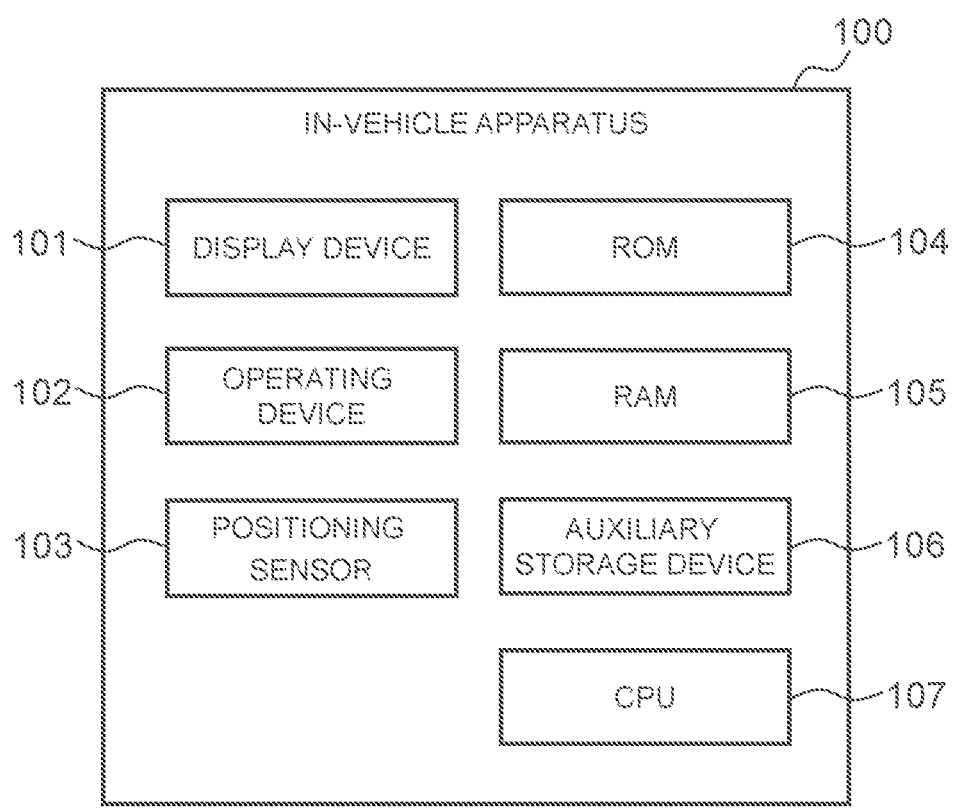
FIG. 1 is a hardware configuration diagram of the in-vehicle apparatus according to an embodiment of the present invention.

FIG. 1 is a configuration diagram showing a hardware configuration of the in-vehicle apparatus according to the present invention. In FIG. 1, an in-vehicle apparatus 100 is configured from a display device 101, an operating device 102, a positioning sensor 103, a ROM (Read Only Memory) 104, a RAM (Random Access Memory) 105, an auxiliary storage device 106, and a CPU (Central Processing Unit) 107.

The display device 101 is a device such as a liquid crystal display or an organic EL display which displays image information. The operating device 102 is a device such as buttons, switches, a keyboard or a touch panel for manually operating the in-vehicle apparatus 100 and which receives operations from the user. The positioning sensor 103 is a sensor of a GPS (Global Positioning System) or the like for positioning the current position of a vehicle (own vehicle position) based on latitude and longitude.

The ROM 104 is a read-only storage device with control programs and the like written therein. The RAM 105 is a storage device for loading the programs stored in the auxiliary storage device 106 or temporarily storing data.

The auxiliary storage device 106 is a storage device which stores map data (map information), audio data, guidance information, and car navigation application programs, and is configured, for example, from an HDD (Hard Disk Drive) or an SSD (Solid State Drive). The CPU 107 is an arithmetic/control unit which controls the respective components of the in-vehicle apparatus 100 and executes the application programs loaded into the RAM 105.

Figure 2:
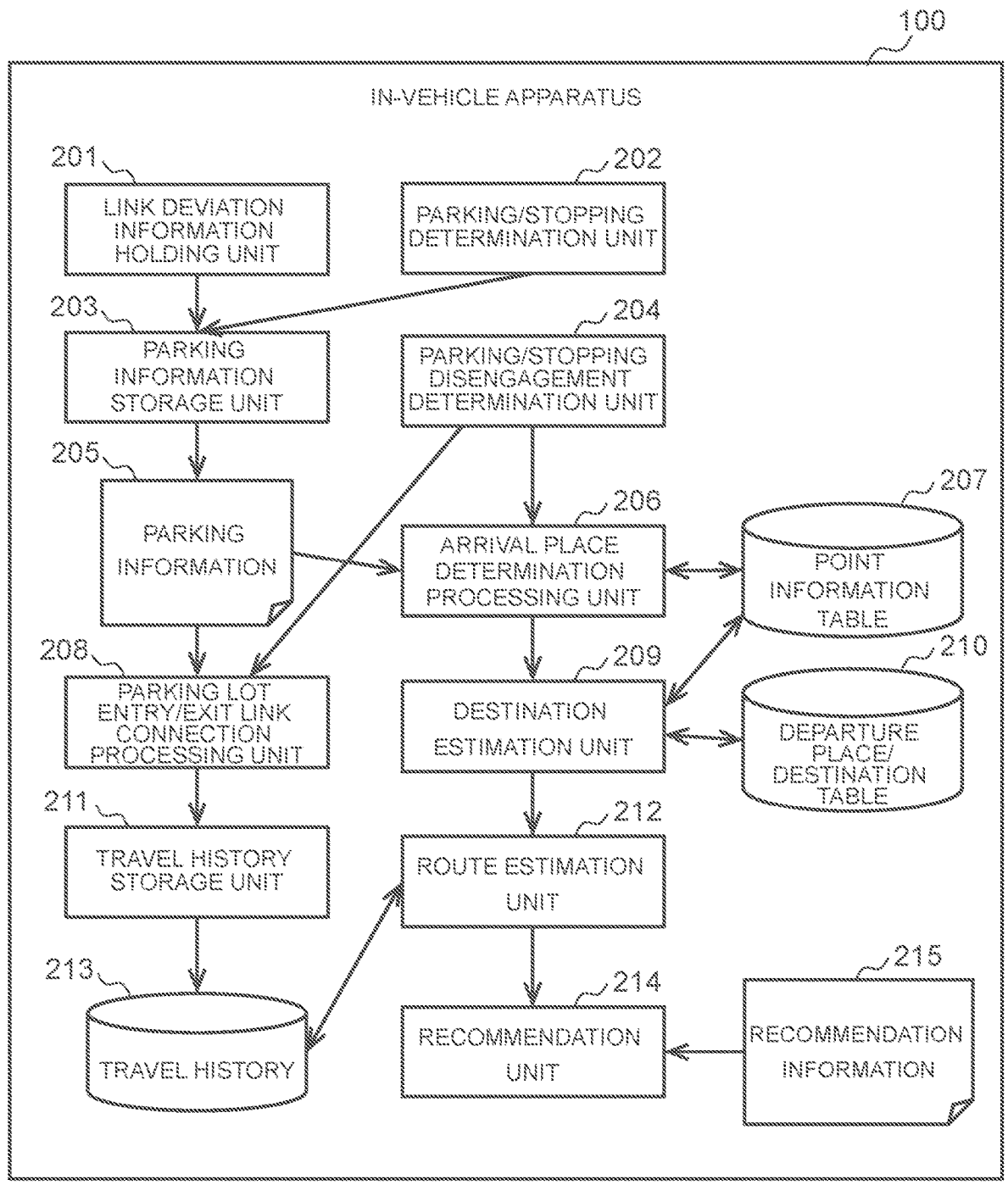
FIG. 2 is a software configuration diagram of the in-vehicle apparatus according to an embodiment of the present invention.

FIG. 2 is a configuration diagram showing the software configuration of the in-vehicle apparatus according to the present invention. In FIG. 2, the in-vehicle apparatus 100 comprises a link deviation information holding unit 201, a parking/stopping determination unit 202, a parking information storage unit 203, a parking/stopping disengagement determination unit 204, a parking information 205, an arrival place determination processing unit 206, a point information table 207, a parking lot entry/exit link connection processing unit 208, a destination estimation unit 209, a departure place/destination table 210, a travel history storage unit 211, a route estimation unit 212, a travel history 213, a recommendation unit 214, and recommendation information 215, and is mounted on a vehicle (not shown).

Here, the link deviation information holding unit 201, the parking/stopping determination unit 202, the parking information storage unit 203, the parking/stopping disengagement determination unit 204, the arrival place determination processing unit 206, the parking lot entry/exit link connection processing unit 208, the destination estimation unit 209, the travel history storage unit 211, the route estimation unit 212, and the recommendation unit 214 are programs (control programs) to be executed by the CPU 107, and are recorded in the auxiliary storage device 106.

When a vehicle's deviation from the road is detected from the information of the positioning sensor 103, for example, when it is detected that upon arriving at the destination set in the car navigation, the vehicle entered a facility such as a parking lot adjacent to the destination from the road (link) of the destination and the vehicle thereby deviated from the road (link), the link deviation information holding unit 201 holds the vehicle direction from the position information (position information of the vehicle) based on the positioning of the positioning sensor 103, and holds the link ID (Identification) when the vehicle deviated from the link from the map information (map information stored in the auxiliary storage device 106).

The parking/stopping determination unit 202 uses the vehicle speed, position information, and switch OFF (ignition switch being turned OFF) and determines the parking or stopping of the vehicle as parking/stopping. In other words, the parking/stopping determination unit 202 determines whether the vehicle has parked/stopped. Here, the parking/stopping determination unit 202 determines whether the vehicle has parked, for example, when the switch is turned OFF. Moreover, the parking/stopping determination unit 202 determines whether the vehicle has stopped by setting a constant value to the vehicle speed or the travel distance of the vehicle, such as when the vehicle speed is near 0 for a fixed period of time or when there is hardly any movement in the position of the vehicle (there is hardly any travel distance of the vehicle) from the position information.

The parking information storage unit 203 creates parking information 205 using the information held by the link deviation information holding unit 201 when the vehicle deviated from the link, and creates parking information 205 using the information of the link (link ID) on which the vehicle currently exists when the vehicle did not deviate from the link. Here, the parking information storage unit 203 can store, as parking information, the history of the vehicle when it parked in a parking lot within a facility in the vicinity of the destination.

The parking/stopping disengagement determination unit 204 determines that the vehicle changed from a parked/stopped state to a traveling state from the vehicle speed, position information of the vehicle, and switch ON (ignition switch being turned ON). Here, the parking/stopping disengagement determination unit 204 determines that the vehicle has disengaged from its parked state, for example, when the switch is turned ON at the time that the vehicle changed from a parked state to a traveling state. Moreover, the parking/stopping disengagement determination unit 204 determines that the speed from a stopped state has changed to a constant value or more when the vehicle changed from a parked state to a traveling state, and determines that the vehicle changed from a parked state to a traveling state when the movement of the position of the vehicle occurs for a constant value or more.

The parking information 205 includes a link ID, a parking direction, and a link entry direction (entry direction of the vehicle into a facility such as a parking lot from the link) when the vehicle deviated from the link. Furthermore, height information of the vehicle from the positioning sensor 103 or the like may be used and the height of the vehicle may also be added to the parking information 205.

The arrival place determination processing unit 206 refers to the parking information 205 and the point information table 207 and determines the parking point (parking spot). Point information as the departure place and the arrival place may also be written in the point information table 207 as needed. Note that the arrival place determination processing unit 206 may also determine whether the vehicle has arrived at the entrance of the facility including the parking lot in the vicinity of the destination of the vehicle based on the positron information (position information based on the positioning of the positioning sensor 103) indicating the position of the vehicle on the map.

The point information table 207 is a table storing the point information generated from the parking information 205. Information other than the parking information 205, such as the coordinate information of the point, may be written in the point information table 207 as needed.

The parking lot entry/exit link connection processing unit 208 connects an entry link of the vehicle to the parking lot and an exit link of the vehicle from the parking lot and records in the travel history 213, as the history of the vehicle traveling in the parking lot, information indicating from which entry link the vehicle entered and from which exit link the vehicle exited.

The destination estimation unit 209 refers to the information of the point from the point information table 207, refers to the frequency information of the departure place and destination from the departure place/destination table 210, and estimates the next destination.

The departure place/destination table 210 is a table which holds the number of times that the vehicle traveled with the departure place and destination as one set.

The travel history storage unit 211 accumulates, in the travel history 213, a number of passages of the vehicle with an entry link and an exit link as one set indicating from which entry link the vehicle entered and from which exit link the vehicle exited.

The route estimation unit 212 estimates the route to the destination estimated by the destination estimation unit 209. Here, the route estimation unit 212 estimates the route to the destination by using the travel history 213.

The travel history 213 is a database storing the passage frequency for each combination of the entry link/exit link.

The recommendation unit 214 refers to the recommendation information 215 regarding a part of the route estimated by the route estimation unit 212 or the route such as the exit and entrance of the parking lot, and recommends the referenced information to the driver.

The recommendation information 215 holds information required for making a recommendation to the driver.

Figure 3:
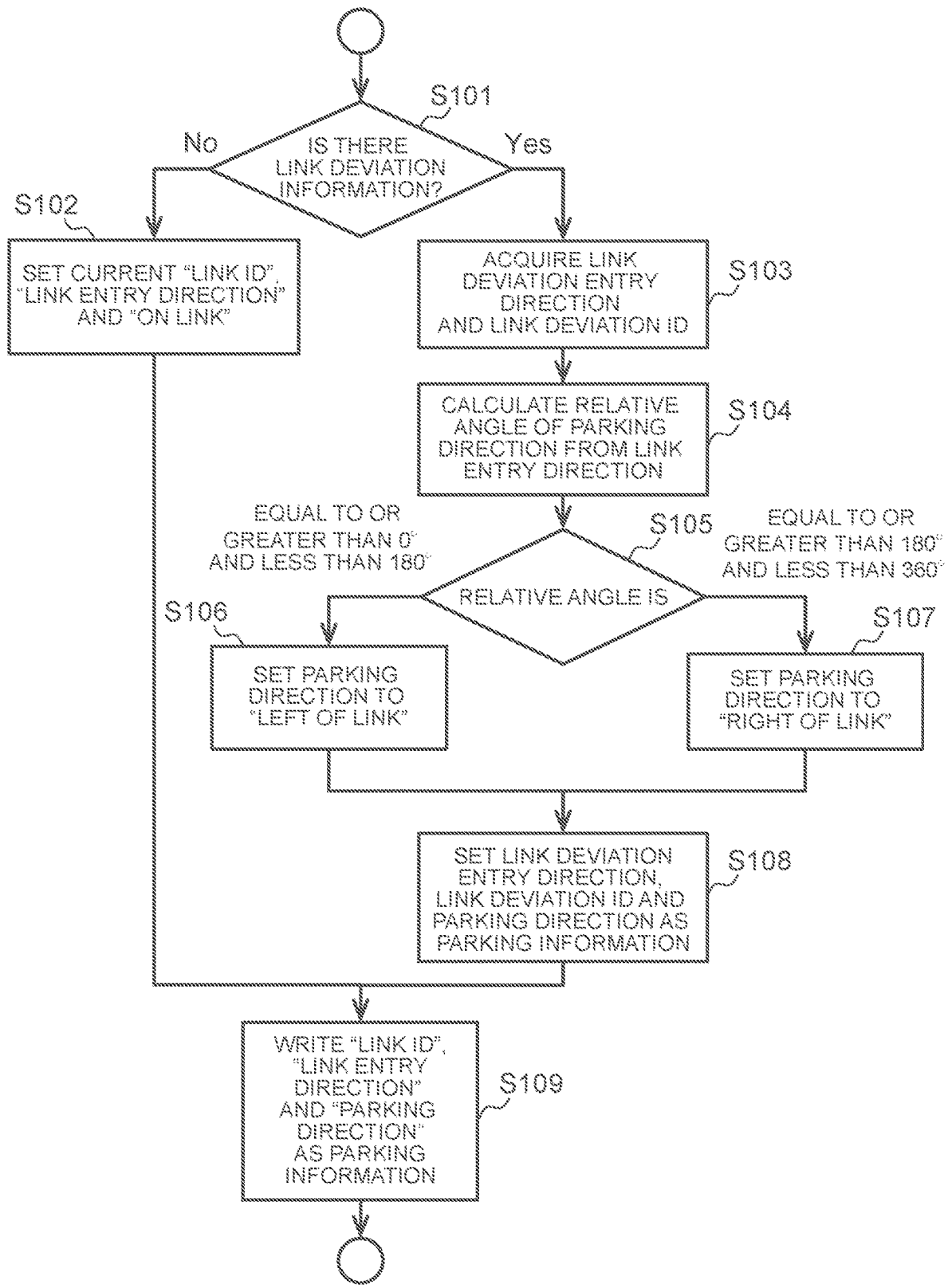
FIG. 3 is a processing flowchart of the parking information storage unit according to an embodiment of the present invention.

FIG. 3 is a processing flowchart showing the processing of the parking information storage unit 203. In FIG. 3, the parking information storage unit 203 starts the processing when the parking/stopping determination unit 202 determines that the vehicle has parked or stopped.

Foremost, the parking information storage unit 203 determines whether there is any link information at the time of deviation (this is hereinafter referred to as the "link deviation information") when the vehicle has parked or stopped (S101). In other words, while the link deviation information holding unit 201 holds the link deviation information of the vehicle when the vehicle deviated from the link, since the link deviation information holding unit 201 is not holding the link deviation information when the vehicle parked/stopped on the link and has not deviated from the link, existence of the link deviation information is confirmed. The parking information storage unit 203 proceeds to the processing of step S102 upon obtaining a negative determination result in step S101 (when there is no link deviation information), and proceeds to the processing of step S103 upon obtaining a positive determination result in step S101 (when there is link deviation information).

The parking information storage unit 203, in step S102, sets the current (traveling) "link ID", "link entry direction", and "on link". In other words, since there is no link deviation information, the parking information storage unit 203, among the information to be written in the parking information 205, sets "link ID" to the "link ID" indicating the current (traveling) link, sets "link entry direction" to the "link entry direction" indicating the entry direction of the current link, sets "parking direction" to "on link", and thereafter proceeds to the processing of step S109. Here, the information set in step S102 is written as the parking information 205 in S109.

In step S103, the parking information storage unit 203 acquires the link entry direction at the time of deviation (this is hereinafter referred to as the "link deviation entry direction") and the link ID at the time of deviation (this is hereinafter referred to as the "link deviation ID") from the link deviation information holding unit 201 as the information held by the link deviation information holding unit 201, and sets the parking information 205 as "link deviation ID" and "link entry direction". The link entry direction is set as the vehicle direction at the time of deviation or the direction of the link.

Next, the parking information storage unit 203 calculates the relative angle of the parking direction from the link entry direction based on the information acquired in step S103 (S104), and determines whether the relative angle, which is the calculation result, is equal to or greater than 0° and less than 180°, or equal to or greater than 180° and less than 360° (S105). In other words, the parking information storage unit 203 determines whether the deviation direction of the vehicle is the left or right of the link when viewed from the direction of the link.

In step S104, until the relative angle of the parking direction is calculated from the link entry direction, foremost, with regard to the direction, east is set to 0°, the value is increased in a counterclockwise rotation, and the range of the value is set to be a value that is equal to or greater than 0° and smaller than 360°. Here, the link entry direction is subtracted from the vehicle direction when the vehicle deviated from the link and, if the subtracted value is a negative value, the product obtained by adding 360° to that value is used as the relative angle.

In step S105, when the parking information storage unit 203 determines that the relative angle calculated in step S104 is equal to or greater than 0° and less than 180°, since the deviation direction of the vehicle is left of the link, the parking information storage unit 203 sets the parking direction of the vehicle (vehicle's entry direction to the parking lot) as "left of link" (S106), and thereafter proceeds to the processing of step S108.

In step S105, when the parking information storage unit 203 determines that the relative angle calculated in step S104 is equal to or greater than 180° and less than 360°, since the deviation direction of the vehicle is right of the link, the parking information storage unit 203 sets the parking direction of the vehicle (vehicle's entry direction to the parking lot) as "right of link" (S107), and thereafter proceeds to the processing of step S108.

In step S108, the parking information storage unit 203 sets, among the information acquired in step S103, the link deviation entry direction, the link ID, and the parking direction set in step S106 or step S107 respectively as the parking information, and thereafter proceeds to the processing of step S109.

In step S109, the parking information storage unit 203 writes "link ID", "link entry direction", and "parking direction", which are information set in step S102 or step S108, as the parking information 205, and thereafter ends the processing of this routine. Note that, when height (floor number) is added to the parking information 205, the height information acquired from a GPS or the like is additionally written in step S109.

FIG. 4 is a configuration diagram showing an example of the point information table. In FIG. 4, the point information table 207 is a table that is created based on the parking information 205, includes a point ID 301, a link deviation ID 302, a vehicle direction 303, a forward direction/reverse direction 304, a parking direction 305, and a floor number (height) 306, and is stored in the auxiliary storage device 106. Here, while information of the lines recorded in the point information table 207 will increase each time that a place where the vehicle has parked/stopped increases, for a place where the vehicle has previously parked/stopped, information of the lines recorded in the point information table 207 will not increase.

The point ID 301 is a point existing on the map and is an identifier for uniquely identifying each point where the vehicle has previously parked/stopped. The point ID 301 stores, for example, the information of "1" to "5" as the point IDs where the vehicle has previously parked/stopped.

The link deviation ID 302 is an identifier which identifies the link when the vehicle deviated from the link. The link deviation ID 302 stores, for example, the information of "10" as the link ID at the time of deviation.

The vehicle direction 303 and the forward direction/reverse direction 304 are information managed as the link entry direction, and record from which side of the link the vehicle entered. The vehicle direction 303 is used when making the determination from the vehicle direction, and the forward direction/reverse direction 304 is used when making the determination from the link entry direction of the map information. The vehicle direction 303 is information indicating the direction (direction that the vehicle is facing) when the vehicle deviated from the link. The vehicle direction 303 stores, for example, the information of "0" when the vehicle is facing an eastward direction. The forward direction/reverse direction 304 is information indicating, when the vehicle deviated from the link and enters a parking lot from the link, whether the vehicle entered the parking lot in a forward direction or in a reverse direction, and is obtained from the map information. The forward direction/reverse direction 304 stores, for example, the information of "forward direction" when the vehicle deviated from the link and enters the parking lot from the link in a forward direction. Note that, while both the information of the vehicle direction 303 and the information of the forward direction/reverse direction 304 may be stored in the point information table 207, only one piece of information is required if it is possible to identify the link entry direction and differentiate the parking direction.

The parking direction 305 is indicating, when the vehicle is to park, whether the parking direction is on the link or a direction on the left or right of the link when viewed from the link. The parking direction 305 stores, for example, when the vehicle deviated from the link and enters the parking lot from the link, the information of "left of link" when the parking lot is positioned on the left side when viewed from the link, and the information of "on link" when the vehicle parks on the link (when the vehicle parks on the street).

The floor number (height) 306 is information indicating, when the vehicle parks in a facility such as a multilevel parking lot, the floor number thereof. The floor number (height) 306 stores, for example the information of "1" when the vehicle parks on the first floor of a facility such as a multilevel parking lot. Note that the floor number (height) 306 may also directly store the information of the actual height of a facility such as a multilevel parking lot. When storing the information of the floor number in the floor number (height) 306, the range of height of each floor number is decided in advance from the height information of the GPS, and the floor number is calculated from the height and then stored. When storing the information of the height in the floor number (height) 306, the height information acquired from the GPS is stored.

Figure 5:
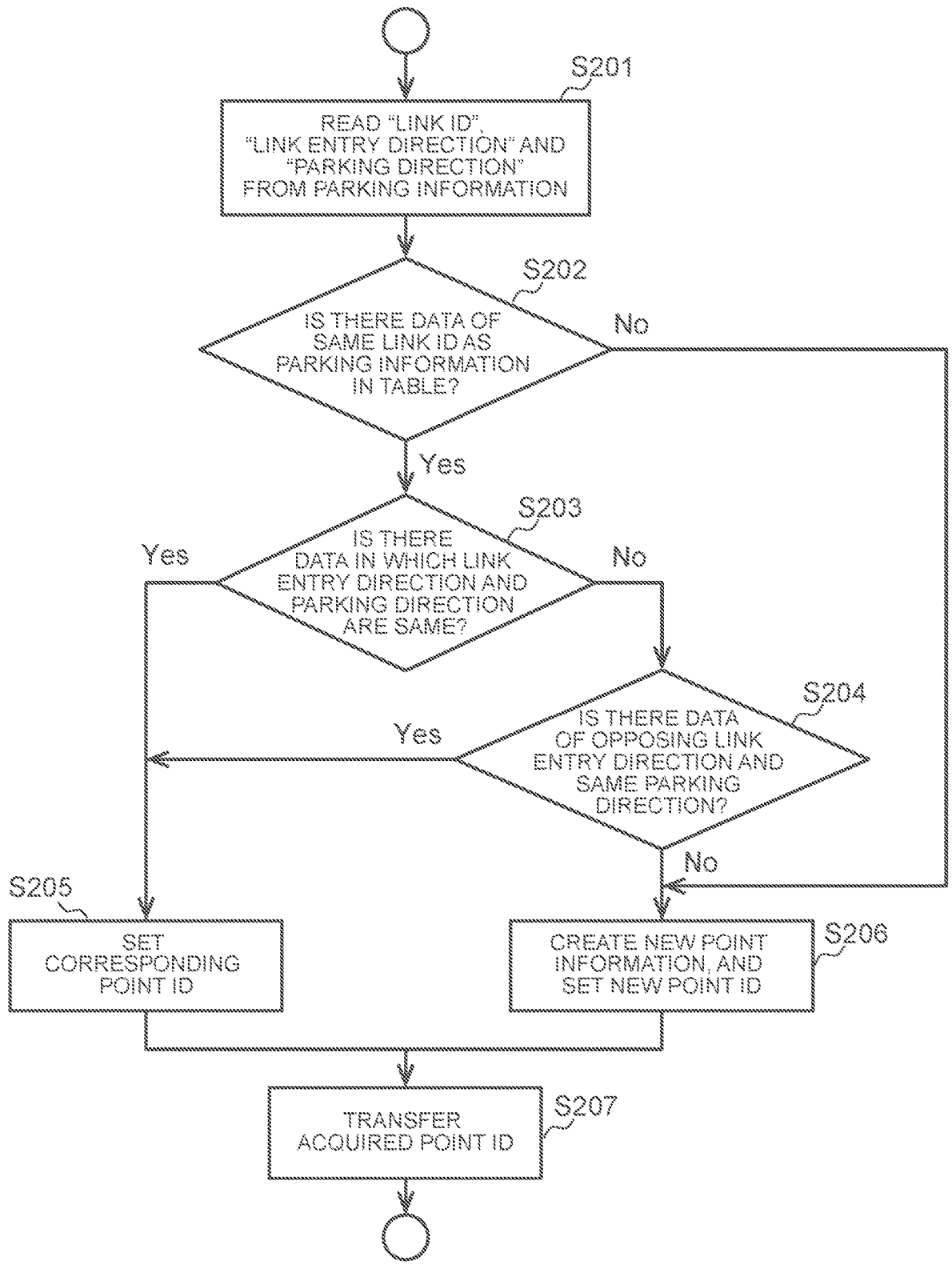
FIG. 5 is a processing flowchart of the arrival place determination processing unit according to an embodiment of the present invention.

FIG. 5 is a processing flowchart showing the processing flow of the arrival place determination processing unit 206. In FIG. 5, the arrival place determination processing unit 206 starts the processing when the parking/stopping disengagement determination unit 204 determines that the vehicle has disengaged from its parked/stopped state.

Foremost, the arrival place determination processing unit 206 reads the "link ID (link deviation ID)", the "link entry direction", and the "parking direction" from the parking information 205 (S201), and determines, based on the read information, whether there is data of the same link ID as the parking information in the table (point information table 207) (S202). In other words, in step S202, whether there is a link deviation ID that is the same as the "link ID (link deviation ID)" acquired in step 201 is confirmed. The arrival place determination processing unit 206 proceeds to the processing of S203 upon obtaining a positive determination result in step S202 (when there is a same link deviation ID), and proceeds to the processing of step S206 upon obtaining a negative determination result in step S202 (when there is no same link deviation ID).

Since it has been confirmed in step S202 that there is a link ID that is the same as the "link deviation ID", in step S203, the arrival place determination processing unit 206 additionally determines whether there is data in which the link entry direction and the parking direction are the same in order to confirm whether the point information table 207 includes a line in which the "link entry direction" and the "parking direction" acquired in step S201 are the same. The arrival place determination processing unit 206 proceeds to the processing of step S205 upon obtaining a positive determination result in step S203 (when the point information table 207 includes a line in which the "link entry direction" and the "parking direction" are the same), and proceeds to the processing of step S204 upon obtaining a negative determination result in step S203 (when the point information table 207 does not include a line in which the "link entry direction" and the "parking direction" are the same).

Next, the arrival place determination processing unit 206 determines whether there is data of the opposing link entry direction and the same parking direction (S204). In other words, since it was determined in step S203 that the point information table 207 does not include information that is the same as the parking information 205, in step S204, determination processing when the vehicle enters the link from the opposite direction is performed. Here, the same link deviation ID is used and the link entry direction when the vehicle enters the link from the opposite direction is determined. Specifically, whether there is a value obtained by adding 180° to the link entry direction of the parking information 205 is confirmed, and whether the point information table 207 includes the same point information when, as the parking direction, "right of link" is set in cases where it is "left of link", and "left of link" is set in cases where it is "right of link". With regard to the parking direction, if 180° is added and the result exceeds 360°, then 360° is subtracted to obtain an appropriate value. When the point information table 207 is storing the parking direction, calculation of the vehicle direction is not performed, and whether "forward direction" or "reverse direction" is stored as the parking direction is confirmed.

The arrival place determination processing unit 206 proceeds to the processing of step S205 upon obtaining a positive determination result in step S204 (when the point information table 207 includes the same point information), and proceeds to the processing of step S206 upon obtaining a negative determination result in step S204 (when the point information table 207 does not include the same point information).

Next, the arrival place determination processing unit 206 sets the corresponding point ID (S205), and thereafter proceeds to the processing of step S207. In other words, when the point information table 207 includes data of the parking information 205 and the point information, the arrival place determination processing unit 206 sets the point ID in the point information table 207.

Meanwhile, when the arrival place determination processing unit 206 obtains a negative determination result in step S202 or step S204 (when the point information table 207 does not include the same point information), the arrival place determination processing unit 206 newly sets a point ID, writes the set point ID in the point information table 207 together with the information of the parking information 205 (S206), and thereafter proceeds to the processing of step S207.

Next, the arrival place determination processing unit 206 transfers the acquired point ID to the destination estimation unit 212 (S207), and thereafter ends the processing of this routine. In other words, in step S207, the arrival place determination processing unit 206 transfers the point ID determined to be the same in step S205, or the point ID newly assigned in step S206, to the destination estimation unit 212. Note that, when including height information in the parking information 205, information related to a plurality of point IDs when the "link ID", the "link entry direction", and the "parking direction" are extracted is transferred to the destination estimation unit 212.

Figure 6:
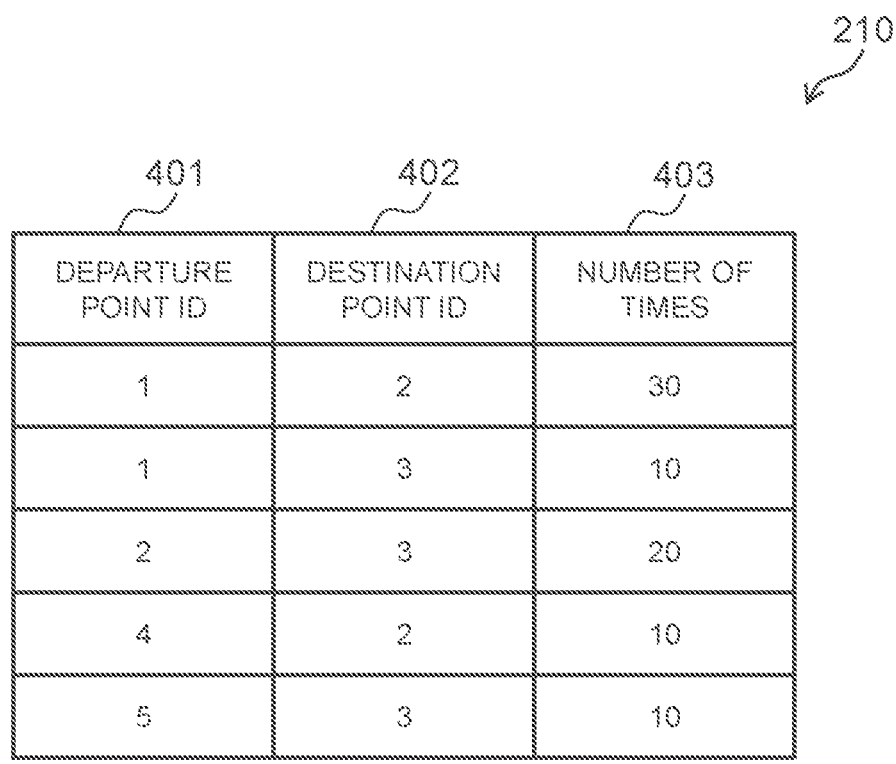
FIG. 6 is a configuration diagram showing an example of the departure place/destination table according to an embodiment of the present invention.

FIG. 6 is a configuration diagram showing an example of the departure place/destination table 210. In FIG. 6, the departure place/destination table 210 is a table including a departure point ID 401, a destination point ID 402, and a number of times 403, and is stored in the auxiliary storage device 106.

The departure point ID 401 is an identifier which uniquely identifies the departure point. The departure point ID 401 stores, for example, "1" as the information of the point ID as the departure point.

The destination point ID 402 is an identifier which uniquely identifies the destination point. The destination point ID 402 stores, for example, "2" as the information of the point ID as the destination point.

The point ID of the departure point ID 401 and the point ID of the destination point ID 402 store information (for example, "1" to "5") existing in the point ID 301 of the point information table 207. When referring to the information of each point ID, information of the corresponding point ID is acquired from the point information table 207.

The number of times 403 is information indicating the number of times that the vehicle traveled with the departure point ID as the departure place and the destination point ID as the destination. The number of times 403 stores, for example, the information of "30" when the vehicle traveled 30 times from the departure place to the destination.

Figure 7:
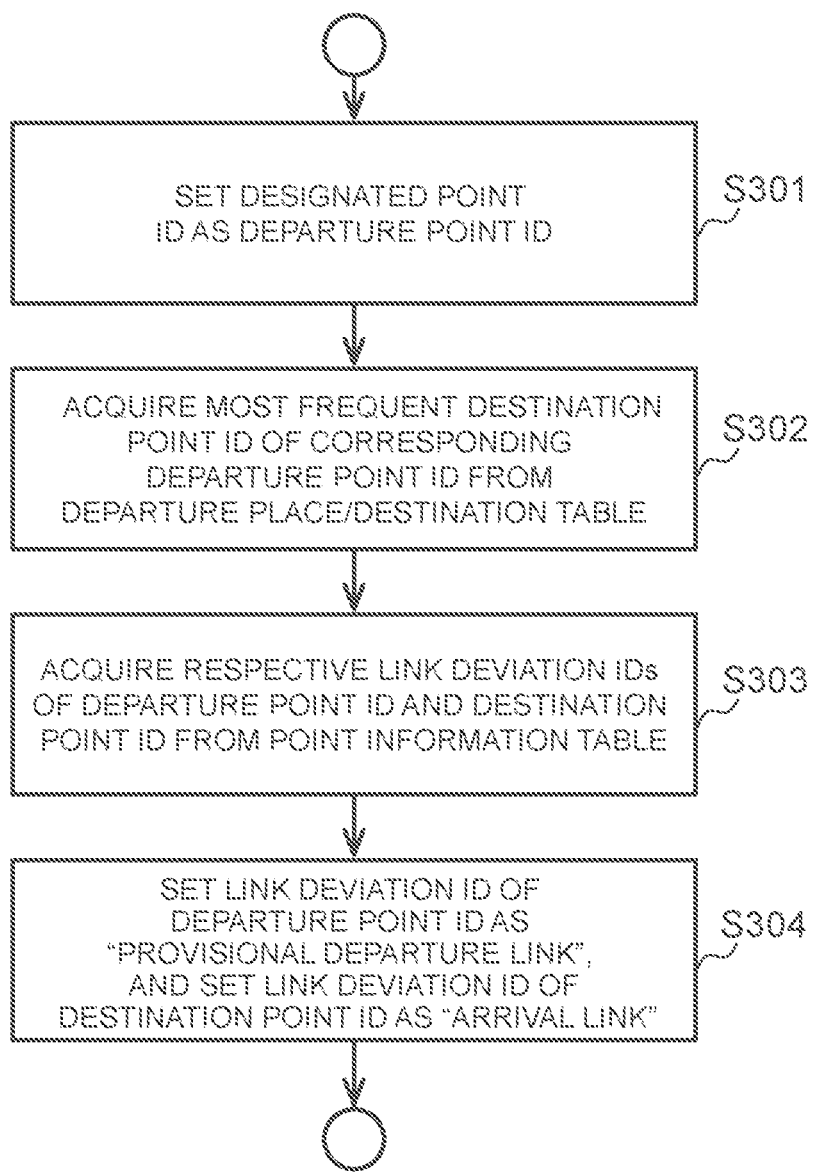
FIG. 7 is a processing flowchart of the destination estimation processing unit according to an embodiment of the present invention.

FIG. 7 is a processing flowchart of the destination estimation unit 209. In FIG. 7, the destination estimation unit 209 refers to the information of the departure place/destination table 210 based on the point ID received from the arrival place determination processing unit 206, estimates the destination, and thereafter acquires the point information of the departure place and the destination from the point information table 207.

Specifically, the destination estimation unit 209 sets the point ID designated by the arrival place determination processing unit 206 (point ID transferred from the arrival place determination processing unit 206) as the departure point ID (S301), and then acquires the most frequent destination point ID among the departure point IDs from the departure place/destination table 210 (S302). In other words, in step S302, the destination estimation unit 209 selects the destination point ID in which the information of the number of times 403 is most frequent among the departure point IDs set in step S301 from the departure place/destination table 210. Note that, when including height information, a plurality of departure point IDs are designated in a quantity corresponding to the number of pieces of information of different heights even when the link deviation ID, the link entry direction, and the parking direction are the same. Thus, when calculating the most frequent destination point ID the number of times of the same destination point ID is totaled, and the departure point ID of the most frequent number of times is selected.

For example, in the case shown in FIG. 6 when the departure point IDs have been set as "1", "4", and "5", the destination point ID 2 is calculated as "40" as a result of totaling the information of the number of times 403 of the departure point ID 1 and the departure point ID 4. The destination point ID 3 is calculated as "20" as a result of totaling the information of the number of times 403 of the departure point ID 1 and the departure point ID 5. Consequently, as the destination point ID in which the information of the number of times 403 is most frequent, the destination point ID 2 in which the number of times="40" is selected. As the departure point ID, since the same link deviation ID can be acquired in step S303 among a plurality of point IDs, any point ID may be selected.

Since the departure point ID and the destination point ID are decided with the processing up to step S302, the destination estimation unit 209 subsequently refers to the corresponding point ID from the point information table 207, acquires the link deviation ID of the departure point ID and the link deviation ID of the destination point ID (S303), thereafter sets the link deviation ID of the departure point ID as the "provisional departure link" and sets the link deviation ID of the destination point ID as the "arrival link" (S30), and then ends the processing of this routine.

FIG. 8 is a configuration diagram showing an example of the travel history 213. In FIG. 8, the travel history 213 is a database which accumulates information stored in the travel history storage unit 211, is a database which accumulates, as a history, the number of times for each combination of an entry link when the vehicle entered a facility such as a parking lot and an exit link when the vehicle exited from the facility, and is stored in the auxiliary storage device 106.

The entry link 501 is an identifier which uniquely identifies the entry link when the vehicle entered a facility such as a parking lot. The entry link 501 stores, for example, the information of "1" as the ID for identifying the entry link when the vehicle entered the facility.

The exit link 502 is an identifier which uniquely identifies the exit link when the vehicle exited a facility such as a parking lot. The exit link 502 stores, for example, the information of "2" as the ID for identifying the exit link when the vehicle exited the facility. The exited link ID is stored.

The entry link 501 and the exit link 502 store information of the link ID stored in the map information, but depending on the format of the map information, information such as a mesh ID as information for uniquely identifying the link is sometimes stored in addition to the link ID. Here, the mesh ID is also separately created as column information, and the created column information is managed as information to be stored in the entry link 501 and the exit link 502. In other words, information required for uniquely identifying the link may all be stored in the entry link 501 and the exit link 502.

Figure 9:
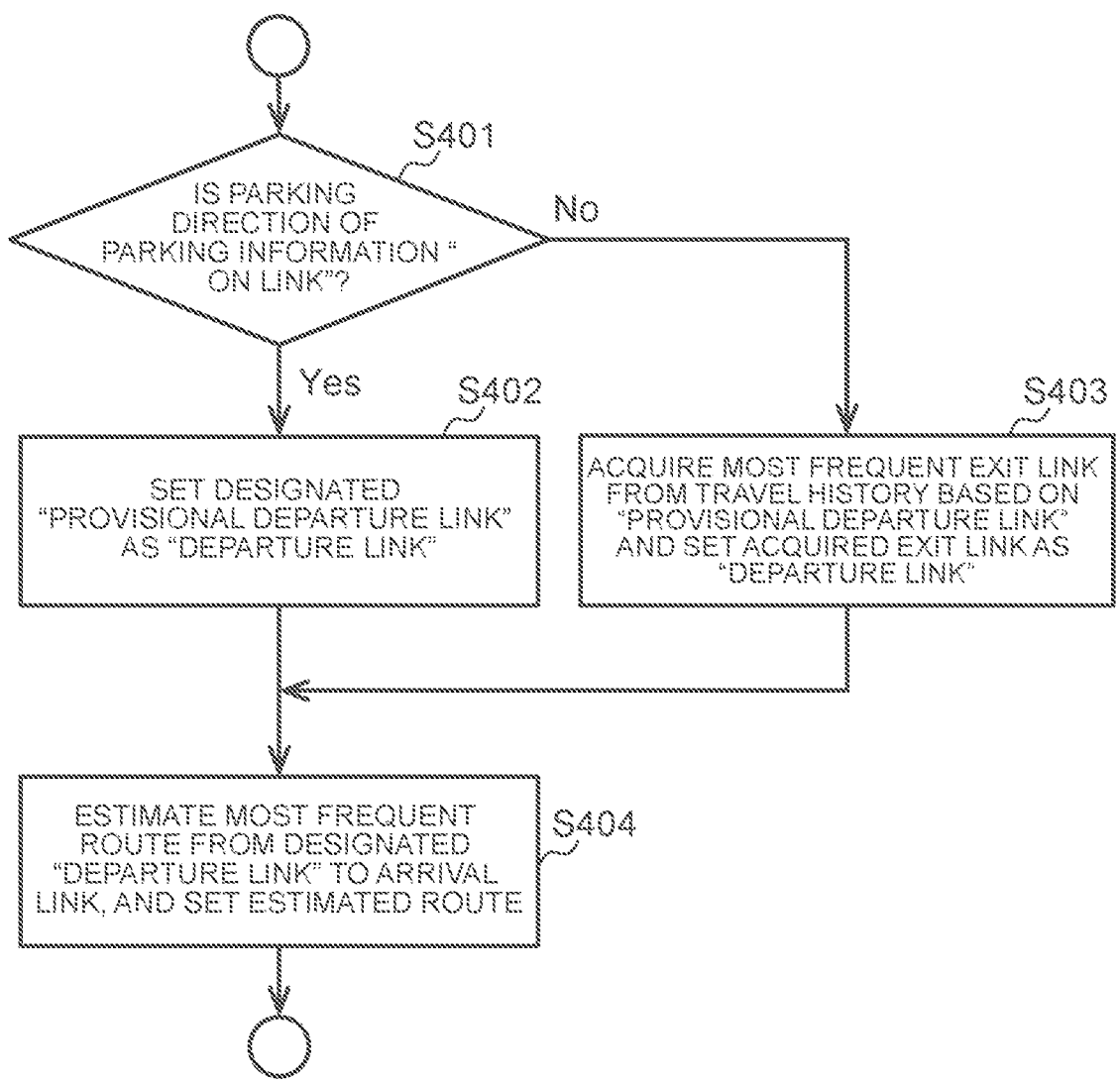
FIG. 9 is a processing flowchart of the route estimation unit according to an embodiment of the present invention.

FIG. 9 is a processing flowchart showing the processing of the route estimation unit 212. In FIG. 9, the route estimation unit 212 estimates the route between the departure place (entry link) and the destination (exit link) from the travel history 213 by using the departure link (provisional departure link) and the arrival link estimated by the destination estimation unit 209.

Specifically, the route estimation unit 212 foremost determines whether the parking direction stored in the parking information 205 is "on link" (S401), proceeds to the processing of step S402 upon obtaining a positive determination result in step S401 (when the parking direction is "on link"), and proceeds to the processing of step S403 upon obtaining a negative determination result in step S401 (when the parking direction is other than "on link" and is "left of link" or "right of link").

In step S402, since the parking direction is "on link", the route estimation unit 212 sets the link ID of the designated "provisional departure link" as the link ID of the "departure link", and thereafter proceeds to the processing of step S404.

Moreover, in step S403, since the parking information is not "on link", the route estimation unit 212 acquires the most frequent exit link from the travel history 213 based on the "provisional departure link", sets the acquired exit link as the "departure link", and thereafter proceeds to the processing of step S404.

Here, when the provisional departure link is to be set as the entry link from the travel history 213, the ID of the exit link 502 in which the information of the number of times 503 is most frequent is set as the ID of the departure link. For example, in the case shown in FIG. 8, when the ID of the provisional departure link is "1", "2" is selected as the ID of the exit link 502 in which the information of the number of times 503 is "30". Thus, the ID of the departure link will be "2".

Next, the route estimation unit 212 estimates the most frequent route from the designated "departure link" to the arrival link, sets the route that was estimated as the estimated route (S404), and thereafter ends the processing of this routine. In other words, in step S404, the most frequent route from the set departure link to the arrival link is estimated, and the route that was estimated is set as the estimated route. When estimating the most frequent route, foremost, the departure link is designated as the entry link, and the ID of the exit link 502 in which the information of the number of times 503 is most frequent is acquired. Furthermore, with such exit link as the departure link, the ID of the exit link in which the information of the number of times 503 is most frequent is acquired, and this process is repeated from the "departure link" to the arrival link to trace the exit link in which the information of the number of times 503 is most frequent in order to estimate the most frequent route.

Note that, in step S404, when it is determined that the information of the departure link (entry link) does not exist in the travel history 213, since it is a place that was visited for the first time, estimation of the estimated route is not performed.

Figure 10:
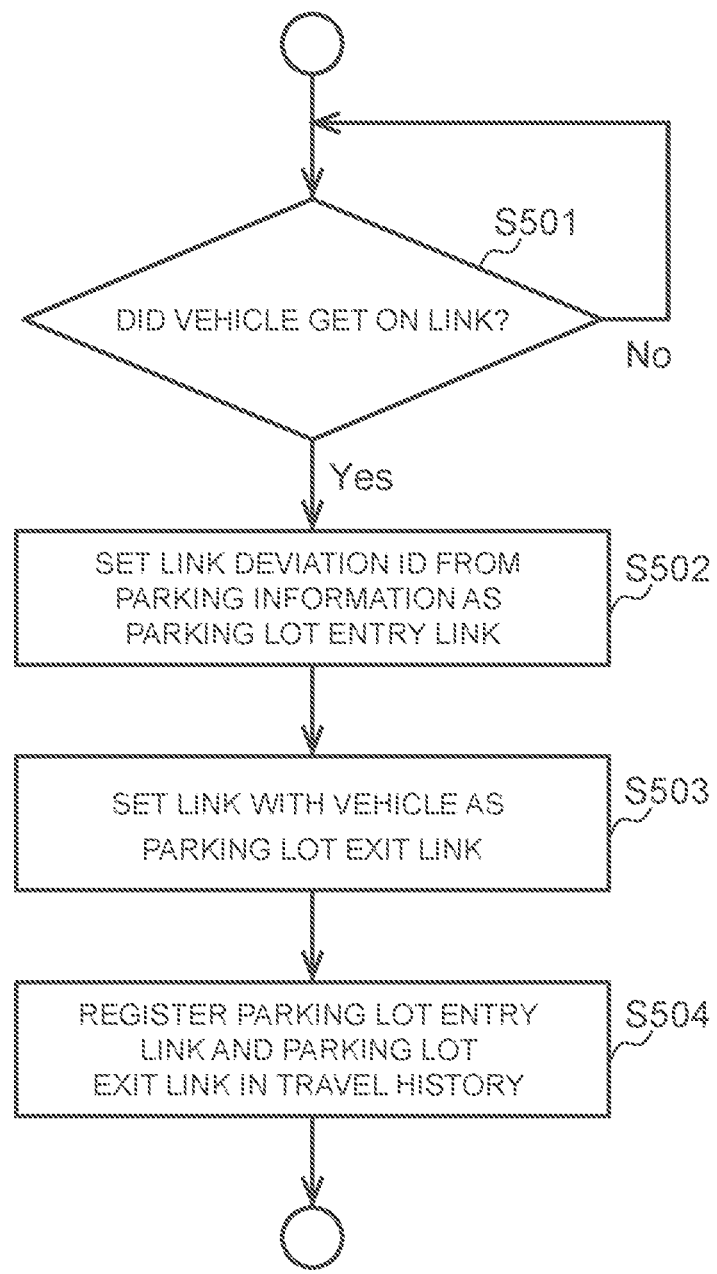
FIG. 10 is a processing flowchart of the parking lot entry/exit link connection processing unit according to an embodiment of the present invention.

FIG. 10 is a processing flowchart showing the processing of the parking lot entry/exit link connection processing unit 208. In FIG. 10, the parking lot entry/exit link connection processing unit 208 starts the processing when the parking/stopping disengagement determination unit 204 determines that the vehicle has disengaged from its parked/stopped state.

Foremost, the parking lot entry/exit link connection processing unit 208 determines whether the vehicle, after disengaging from its parked/stopped state, has gotten on the link for the first time (S501). Here, the parking lot entry/exit link connection processing unit 208 stands by to perform processing until the vehicle gets on the link for the first time after disengaging from its parked/stopped state, and, when the vehicle got on the link for the first time after disengaging from its parked/stopped state, acquires the link deviation ID from the parking information 205, and sets the acquired link deviation ID as the parking lot entry link (S502).

Next, the parking lot entry/exit link connection processing unit 208 sets the link on which the vehicle got on in step S501 as the parking lot exit link (S503).

Next, the parking lot entry/exit link connection processing unit 208 sets the entry link and the exit link in the travel history 213 with the parking lot entry link as the entry link and the parking lot exit link as the exit link (S504), and thereafter ends the processing of this routine.

Figure 11:
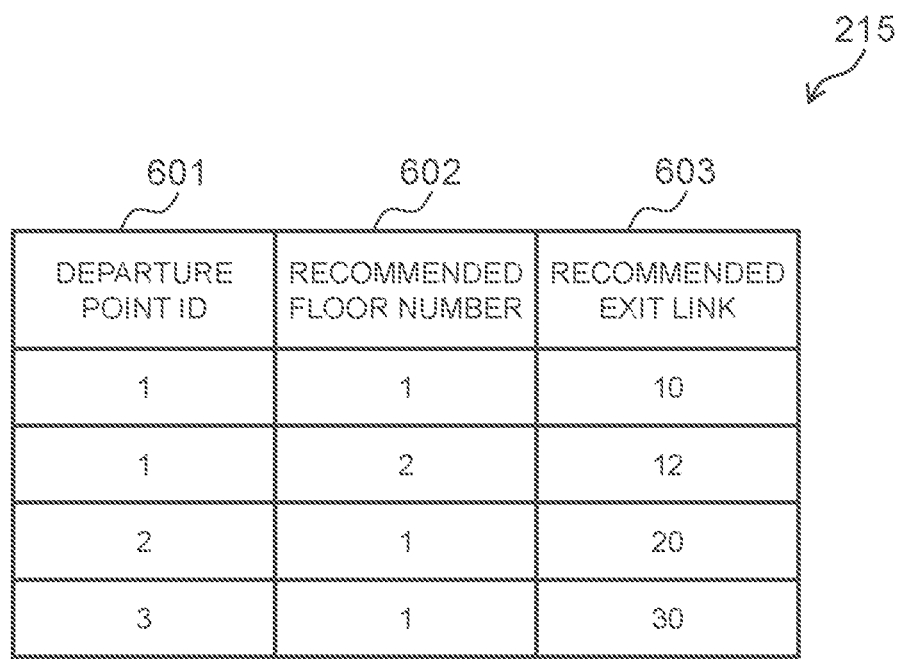
FIG. 11 is a configuration diagram showing an example of the recommendation information according to an embodiment of the present invention.

FIG. 11 is a configuration diagram showing an example of the recommendation information 215. In FIG. 11, the recommendation information 215 includes a departure point ID 601, a recommended floor number 602, and a recommended exit link 603, and is stored in the auxiliary storage device 106.

The departure point ID 601 is an identifier which uniquely identifies the departure point of the vehicle. The departure point ID 601 stores, for example, the information of "1" as the identifier for identifying the departure point of the vehicle. In other words, the departure point ID 601 stores the information of the ID stored in the point ID 301 of the point information table 207.

The recommended floor number 602 is information recommended as the floor number on which the vehicle should park in a facility having a multilevel parking lot. The recommended floor number 602 stores, for example, when the first floor is recommended, the information of "1" as the floor number of the facility having a multilevel parking lot. Note that the recommended floor number 602 may also store information of the height of the facility having a multilevel parking lot. Moreover, when storing the information of the floor number of the facility, the range of height of each floor number is decided in advance from the height information of a GPS, and the floor number may be calculated from the height. Furthermore, when storing the information of the height of the facility, the height information that can be acquired from the GPS may be used.

The recommended exit link 603 is information recommended as the link when the vehicle is to exit the facility having a multilevel parking lot. For example, if it is possible to know that there is traffic on the route from the calculated exit link based on the route estimation unit 212, an exit link can be used as the departure link of the route for avoiding the traffic by exiting from the link of the recommended exit link 603.

Note that the recommendation information 215 is created using a server (not shown), and downloaded to the in-vehicle apparatus 100. When creating the recommendation information 215 with a server, the travel history 213, the point information table 207, and the departure place/destination table 210 of each in-vehicle apparatus 100 are uploaded.

Moreover, when the server is to calculate the information of the recommended floor number 602, the point information table 207 and the departure place/destination table 210 uploaded from each in-vehicle apparatus 100 are connected. Here, as the key upon integrating the information of the respective tables, the point ID of the point information table 207 and the point ID of the departure place/destination table 210 are used. In the connected table, the information of the most frequent floor number (306) is set as the recommended floor number 602 in the same link deviation ID, link entry direction, and parking direction, and the departure point ID and the recommended floor number 602 are used as the recommendation information 215.

Moreover, when calculating the information of the recommended exit link 603, the information of the travel history 213 uploaded from each in-vehicle apparatus 100 is totaled in advance. In other words, the information of the number of times 503 in which the entry link 501 and the exit link 502 of the travel history 213 are the same is totaled in a quantity corresponding to the number of in-vehicle apparatuses. After calculating the information of the recommended floor number 602, the information of the link deviation ID 302 is acquired from the point information table 207 in which the calculated departure point ID is the point ID the link deviation ID 302 is set as the entry link 501 from the travel history 213, and the information of the exit link 502 in which the information of the number of times 503 is most frequent is used as the information of the recommended exit link 603.

Figure 12:
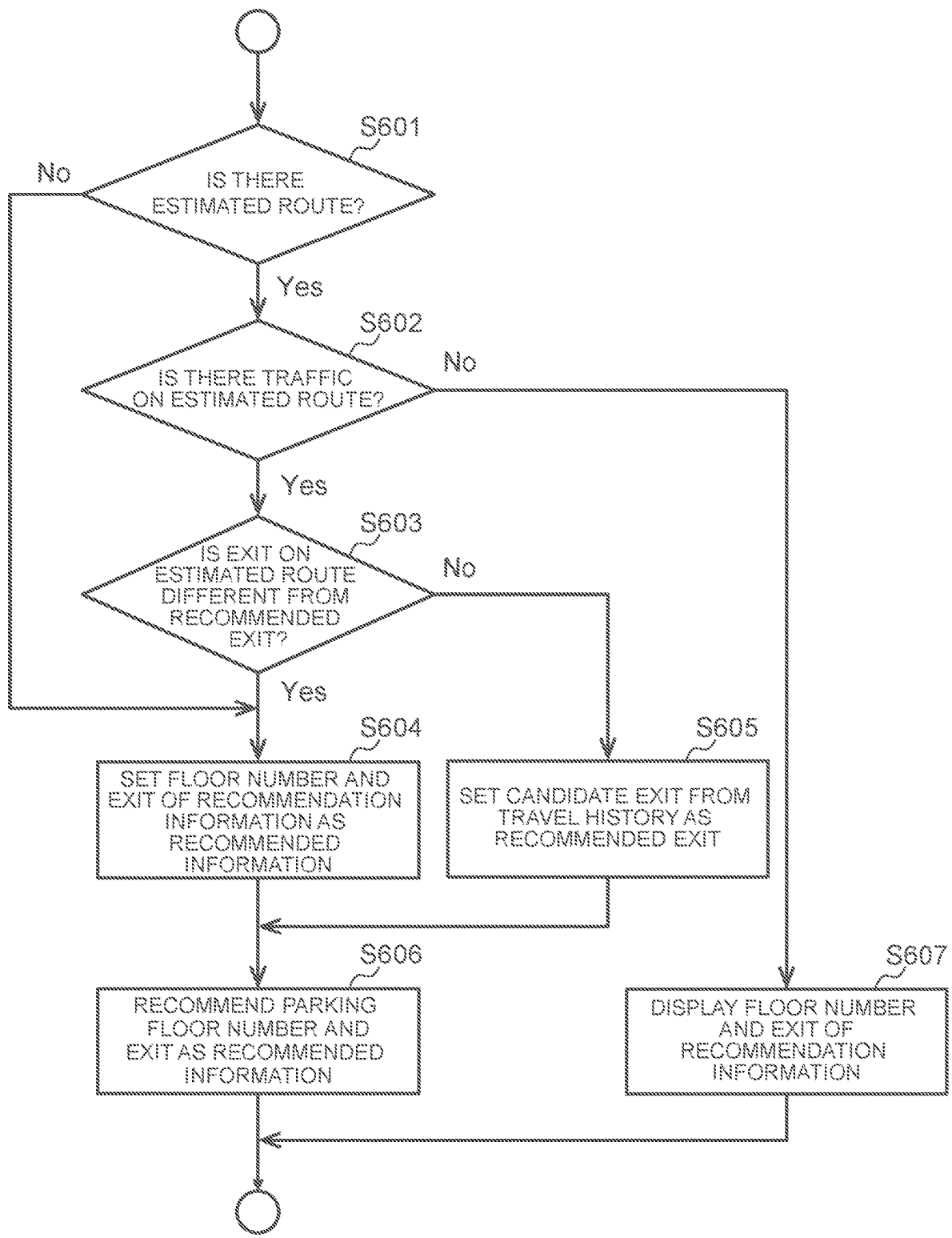
FIG. 12 is a processing flowchart of the recommendation unit according to an embodiment of the present invention.

FIG. 12 is a processing flowchart showing the processing of the recommendation unit 214. In FIG. 12, the recommendation unit 214 uses the recommendation information 215 and recommends information to the driver.

Specifically, the recommendation unit 214 foremost determines whether there is an estimated route in order to confirm the existence of an estimated route (S601). In other words, in step S601, it is determined whether the link has been traveled by the vehicle for the first time. The recommendation unit 214 proceeds to the processing of step S604 upon obtaining a negative determination result in step S601 (when there is no estimated route and the link has been traveled by the vehicle for the first time), and proceeds to the processing of step S602 upon obtaining a positive determination result in step S601 (when an estimated route can be calculated and the link has been previously traveled by the vehicle).

Next, the recommendation unit 214 uses traffic information such as VICS (registered trademark) information and determines whether there is traffic on the estimated route (S602), proceeds to the processing of step S607 upon obtaining a negative determination result in step S602 (when there is no traffic on the estimated route), and proceeds to the processing of step S603 upon obtaining a positive determination result in step S602 (when there is traffic or the estimated route).

In step S603, the recommendation unit 214 determines whether the exit on the estimated route and the recommended exit are different, proceeds to the processing of step S604 upon obtaining a positive determination result in step S603 (when the exit on the estimated route and the recommended exit are different), sets the floor number (recommended floor number 602) and the exit (recommended exit link 603) of the recommendation information 215 as the recommended information, and thereafter proceeds to the processing of step S606. Note that, in S603, the recommendation unit 214 compares the information of the recommended exit link 603 in the recommendation information 215 and the information of the exit link on the estimated route. Here, the exit link on the estimated route means the first link of the estimated route.

Moreover, the recommendation unit 214 proceeds to the processing of step S605 upon obtaining a negative determination result in step S603 (when the exit on the estimated route and the recommended exit are the same), sets a candidate exit as the recommended exit from the travel history 213, and thereafter proceeds to the processing of step S606. Note that, in step S605, the second-best route after the route estimated in step S601 is estimated from the travel history 213, the departure link is set as the entry link, and the exit link with the next frequent number of times (exit link in which the information of the number of times 503 of the travel history 213 is next frequent) is set as the recommended exit.

Next, the recommendation unit 214 recommends the parking floor number and the exit to the driver as the recommended information (S606), and thereafter ends the processing of this routine. Here, in step S606, the recommendation unit 214 informs the driver, via a speaker, the exit and the floor number (parking floor number) set in the recommended information as the guidance information. For example, an announcement to the effect of "The usual exit will lead to traffic", "You can avoid traffic by using this exit" is output, the route is displayed on the display device 101, and the driver is guided to the displayed route. Moreover, with regard to the parking floor number, an announcement to the effect of "You should park on the second floor of your destination" is output, and the driver is thereby guided to the destination.

Moreover, the recommendation unit 214 displays, on the display device 101, the floor number (parking floor number) and the exit of the recommended information as the guidance information (S607), and thereafter ends the processing of this routine. Note that, in step S607, only the floor number and the exit of the recommended information are displayed on the display device 101 as the guidance information, and the driver may select the notification of the information.

In this embodiment, the display device 101 functions as a display unit for displaying the guidance information on a display screen. Here, an audio output unit which converts the guidance information into audio signals and outputs such audio signals may be built into the display device 101, or mounted in the in-vehicle apparatus 100. In the foregoing case, the audio output unit incorporates the guidance information stored in the ROM 104 via the CPU 107, and can be configured from a digital/analog converter which converts the guidance information into analog signals and a speaker which outputs the analog signals as audio.

According to this embodiment, it is possible to provide a vehicle with information for using a facility having a parking lot and, consequently, it is possible to improve the user-friendliness for the driver. Moreover, according to this embodiment, it is possible to propose an estimated route by giving consideration to the entrance to be used when entering the parking lot, or, when the road from the usual exit of the parking lot is congested, it is possible to inform the driver of the traffic when the usual exit is used, and propose that the driver use a different exit this time. Furthermore, it is possible to propose a more favorable parking space within the parking lot to the driver.

Note that the present invention is not limited to the foregoing embodiment, and includes various modified examples. For example, the in-vehicle apparatus 100 of this embodiment may present, to the driver, necessary information within an area without any road links outside the parking lot of a facility.

Moreover, when the arrival place determination processing 206 determines that the vehicle has arrived at the facility, the recommendation unit 214 may refer to the parking information 205 and output guidance information as information which guides the vehicle based on the recommendation information 215 and which includes at least a parking position in the parking lot. The recommendation unit 214 can thereby guide the vehicle (driver) to the parking position based on the guidance information when the vehicle arrives at the facility. Moreover, when it is detected that the vehicle has deviated from a road (link) connected to the facility based on the position information from the positioning of the positioning sensor 103 on a condition that the parking/stopping determination unit 202 has determined that the vehicle has parked/stopped, the link deviation information holding unit 201 may also function as a deviation information holding unit which holds deviation information (link deviation information) including an entry direction of the vehicle into the facility and a point and parking direction at the time of deviation (at the time of link deviation). Here, the parking information storage unit 203 stores the deviation information held by the deviation information holding unit as information of a part of the parking information.

Moreover, the destination estimation unit 212 can refer to the departure place/destination table 210 based on information (point information) of a point that the vehicle entered the facility when the arrival place determination processing unit 206 determines that the vehicle has arrived at the facility, and estimate the destination point belonging to a route in which the number of times 403 is most frequent as the vehicle's destination within the facility. Here, the recommendation unit 214 can output, as information belonging to the guidance information, the destination point estimated as the vehicle's destination within the facility. The recommendation unit 214 can thereby guide the vehicle (driver), based on the guidance information, to the destination point estimated as the vehicle's destination within the facility when the vehicle arrives at the facility.

Moreover, the route estimation unit 212 can refer to the travel history 213 when the vehicle is to exit from the parking lot of the facility, and estimate a route in which the number of times 503 is most frequent and which is a route from the vehicle's parking position to the exit link 502. Here, the recommendation unit 214 can output the exit link 502 as information belonging to the guidance information on a condition that the route estimation unit 212 has estimated a route to the exit link 502. The recommendation unit 214 can thereby guide the vehicle (driver) to the exit link based on the guidance information when the vehicle is to exit from the parking lot of the facility.

Moreover, a part of the configuration of a certain embodiment may be added to, deleted from or replaced with another configuration. Furthermore, a part or all of the respective configurations, functions and the like described above may be realized, for example with hardware by being designed with an integrated circuit. Moreover, a part or all of the respective configurations, functions and the like described above may be realized with software by a processor interpreting and executing the programs which realize the respective functions. Information of programs, tables and files for realizing the respective functions may be recorded in a memory, a hard disk, an SSD (Solid State Drive) or any other recording device, or may otherwise be recorded on an IC (Integrated Circuit) card, an SD (Secure Digital) memory card, a DVD (Digital Versatile Disc) or any other recording medium.

The disclosure of the following priority application is incorporated herein by reference.

Japanese Patent Application No. 2018-193904 (filed on Oct. 12, 2018)

REFERENCE SIGNS LIST 100 in-vehicle apparatus, 101 display device, 102 operating device, 103 positioning sensor, 106 auxiliary storage device, 107 CPU

The invention claimed is:

1. An in-vehicle apparatus, comprising:
   an arrival place determination processing unit configured to determine, based on position information indicating a position of a vehicle on a map, whether the vehicle has arrived at an entrance of an area in a vicinity of a destination of the vehicle where road links do not exist;
   a parking information storage unit configured to store, as parking information, a history of the vehicle having parked in the area;
   a recommendation unit configured to refer to the parking information when the arrival place determination processing unit determines that the vehicle has arrived at the area, and outputs guidance information as information which guides the vehicle based on recommendation information and which includes at least a parking position in the area;
   a travel history storage unit configured to stores one or more entry links indicating a link when the vehicle enters the area, one or more exit links indicating a link when the vehicle exits the area, and a number of times that the vehicle traveled on a route connecting the entry link and the exit link, as a travel history, for each of the routes; and
   a route estimation unit configured to refer to the travel history when the vehicle exits the area, and estimates a route in which the number of times is most frequent and which is a route from a parking position of the vehicle to the exit link,
   wherein the recommendation unit outputs the exit link as information belonging to the guidance information on a condition that the route estimation unit has estimated a route to the exit link.

2. The in-vehicle apparatus according to claim 1, further comprising:
   a parking/stopping determination unit which determines whether the vehicle has parked/stopped; and
   a deviation information holding unit which holds deviation information, when it is detected that the vehicle has deviated from a road connected to the area based on the position information on a condition that the parking/stopping determination unit has determined that the vehicle has parked/stopped, including an entry direction of the vehicle into the area and a point and parking direction at the time of deviation,
   wherein the parking information storage unit stores the deviation information held by the deviation information holding unit as information of a part of the parking information.

3. The in-vehicle apparatus according to claim 1,
wherein the recommendation unit:
incorporates traffic information on a condition that the route estimation unit has estimated a route to the exit link, and determines whether there is traffic congestion on the estimated route;
when it is determined that there is no traffic congestion on the estimated route, outputs at least a recommended exit set based on the recommendation information as information belonging to the guidance information;
when it is determined that there is traffic congestion on the estimated route, determines whether an exit on the estimated route and the recommended exit set based on the recommendation information are different;
when it is determined that the exit on the estimated route and the recommended exit set based on the recommendation information are different, or when a route to the exit link is not estimated by the route estimation unit, outputs at least the recommended exit set based on the recommendation information as information belonging to the guidance information; and
when the exit on the estimated route and the recommended exit set based on the recommendation information are the same, sets a candidate exit based on the travel history, and outputs the candidate exit as information belonging to the guidance information.

4. The in-vehicle apparatus according to claim 1, further comprising:
an audio output unit which converts the guidance information into an audio signal and outputs the audio signal; and
a display unit which displays the guidance information on a display screen.

5. A processing method of an in-vehicle apparatus, comprising:
an arrival place determination processing step of determining, based on position information indicating a position of a vehicle on a map, whether the vehicle has arrived at an entrance of an area in a vicinity of a destination of the vehicle where road links do not exist;
a parking information storage step of storing, as parking information, a history of the vehicle having parked in the area;
a recommendation step of referring to the parking information when it is determined in the arrival place determination processing step that the vehicle has arrived at the area, and outputting guidance information as information which guides the vehicle based on recommendation information and which includes at least a parking position in the area;
a storing step of using a departure place/destination table to store one or more departure points when the vehicle enters the area, one or more destination points when the vehicle parks in the area, and a number of times that the vehicle traveled on a route connecting the departure point and the destination point, for each of the routes; and
a destination estimation step of referring to the departure place/destination table based on information of a point that the vehicle entered the area when it is determined in the arrival place determination processing step that the vehicle has arrived at the area, and estimating the destination point belonging to a route in which the number of times that the vehicle traveled on a route connecting the departure point and the destination point is most frequent as the vehicle's destination within the area,
wherein, in the recommendation step, the destination point estimated as the vehicle's destination within the area is output as information belonging to the guidance information.

6. The processing method of an in-vehicle apparatus according to claim 5, further comprising:
a parking/stopping determination step of determining whether the vehicle has parked/stopped; and
a deviation information holding step of holding deviation information, when it is detected that the vehicle has deviated from a road connected to the area based on the position information on a condition that it is determined in the parking/stopping determination step that the vehicle has parked/stopped, including an entry direction of the vehicle into the area and a point and parking direction at the time of deviation,
wherein, in the parking information storage step, the deviation information held in the deviation information holding step is stored as information of a part of the parking information.

7. The processing method of an in-vehicle apparatus according to claim 5, further comprising:
an audio output step of converting the guidance information into an audio signal and outputting the audio signal; and
a display step of displaying the guidance information on a display screen.

8. A processing method of an in-vehicle apparatus, comprising:
an arrival place determination processing step of determining, based on position information indicating a position of a vehicle on a map, whether the vehicle has arrived at an entrance of an area in a vicinity of a destination of the vehicle where road links do not exist;
a parking information storage step of storing, as parking information, a history of the vehicle having parked in the area;
a recommendation step of referring to the parking information when it is determined in the arrival place determination processing step that the vehicle has arrived at the area, and outputting guidance information as information which guides the vehicle based on recommendation information and which includes at least a parking position in the area;
a travel history storage step of storing one or more entry links indicating a link when the vehicle enters the area, one or more exit links indicating a link when the vehicle exits the area, and a number of times that the vehicle traveled on a route connecting the entry link and the exit link, as a travel history, for each of the routes; and
a route estimation step of referring to the travel history when the vehicle exits the area, and estimating a route in which the number of times is most frequent and which is a route from a parking position of the vehicle to the exit link,
wherein, the recommendation step, the exit link is output as information belonging to the guidance information on a condition that a route to the exit link has been estimated in the route estimation step.

9. The processing method of an in-vehicle apparatus according to claim 8, wherein, in the recommendation step:
traffic information is incorporated on a condition that a route to the exit link has been estimated in the route estimation step, and whether there is traffic congestion on the estimated route is determined;

when it is determined that there is no traffic congestion on the estimated route, at least a recommended exit set based on the recommendation information is output as information belonging to the guidance information;

when it is determined that there is traffic congestion on the estimate route, whether an exit on the estimated route and the recommended exit set based on the recommendation information are different is determined;

when it is determined that the exit on the estimated route and the recommended exit set based on the recommendation information are different, or when a route to the exit link is not estimated in the route estimation step, at least the recommended exit set based on the recommendation information is output as information belonging to the guidance information; and when the exit on the estimated route and the recommended exit set based on the recommendation information are the same, a candidate exit is set based on the travel history, and the candidate exit is output as information belonging to the guidance information.

10. The processing method of an in-vehicle apparatus according to claim 8, further comprising:

a parking/stopping determination step of determining whether the vehicle has parked/stopped; and a deviation information holding step of holding deviation information, when it is detected that the vehicle has deviated from a road connected to the area based on the position information on a condition that it is determined in the parking/stopping determination step that the vehicle has parked/stopped, including an entry direction of the vehicle into the area and a point and parking direction at the time of deviation, wherein, in the parking information storage step, the deviation information held in the deviation information holding step is stored as information of a part of the parking information.

* * * * *